3,213,019
Patented Oct. 19, 1965

3,213,019
HIGH BARIUM-CONTENT CARBONATED SALTS OF PHOSPHORUS SULFIDE - HYDROCARBON PRODUCTS AND METHOD FOR PREPARING THE SAME
Emil Koft, Jr., Woodbury Heights, and Ferdinand P. Otto, Woodbury, N.J., assignors to Socony Mobil Oil Company, Inc., a corporation of New York
No Drawing. Filed Feb. 15, 1962, Ser. No. 173,340
13 Claims. (Cl. 252—32.7)

The invention is directed to high barium-content salts of phosphorus sulfide-hydrocarbon reaction products and to a process for preparing such salts. It also contemplates the use of these salts as lubricating oil additives.

The use of barium salts of phosphorus sulfide-hydrocarbon reaction products as lubicating oil additives has been known for some time. Furthermore, it has been recognized that basic salts of phosphorus sulfide-hydrocarbon products, i.e., salts having higher metal contents than mere neutral (i.e., normal) salts, are more effective engine oil detergents, on a weight for weight basis, than the neutral salts. Also, it is known that by increasing the metal contents of these salts their basicities are increased whereby they are more effective than lower barium-content salts in neutralizing acids formed by combustion of fuel, particularly high sulfur-content fuels commonly employed in diesel engines. The art has, therefore, sought to prepare barium salts having the highest possible barium contents (i.e., high barium to phosphorus ratios) and a number of methods of preparing such salts have been proposed in th prior art. One such method, described in U.S. Patent No. 2,806,022, issued September 10, 1957, to A. R. Sabol, involves "neutralizing" the phosphorus sulfide-hydrocarbon reaction product with a defined amount of a basic metal compound, such as a barium oxide, in the presence of defined amounts of an alcohol, such as methanol, and water. Examples are given which show the obtainment of barium salts having barium to phosphorus weight ratios as high as 6.0. It will be appreciated, however, that it would be desirable if salts having still higher barium to phosphorus ratios and which are, therefore, still more effective as lubricating oil additives could be produced. The present invention provides a process for producing such salts.

In accordance with the present invention a method has been found producing barium salts of phosphorus sulfide-hydrocarbon reaction products having barium to phosphorus ratios as high as about 36. As far as is known, barium salts having barium to phosphorus ratios of the high level provided by the process of the invention have not been produced heretofore and they are, therefore, believed to be new compositions of matter. Accordingly, it is an object of this invention to provide a new class of barium salts of phosphorous sulfide-hydrocarbon reaction products. It is a further object to provide a novel method for the preparation of such salts. It is a further object to provide lubricating oil compositions containing these high barium-content salts. Other and further objects of the invention will become apparent from the following detailed description of the invention.

Broadly, the process of the invention comprises the steps of (1) forming a reaction mixture of (a) a hydrocarbon solution of a phosphorus sulfide-hydrocarbon reaction product, (b) a methanol solution of barium methylate in an amount to supply to the reaction mixture an excess of barium methylate over that required to form a normal salt of the phosphorus sulfide-hydrocarbon reaction product and (c) water, (2) heating the reaction mixture to a temperature of from about 65° C. to about 200° C. and removing alcohol and water therefrom whereby a basic barium salt of the phosphorus sulfide-hydrocarbon reaction product is formed, (3) carbonating the reaction mixture while maintaining said mixture at a temperature of from about 90° C. to about 200° C., (4) lowering the temperature of the reaction mixture to a level below about 65° C., (5) adding additional methanol-barium methylate solution and water to the reaction mixture, (6) again heating the reaction mixture to a temperature of from about 65° C. to about 200° C. and removing methanol and water therefrom and (7) filtering the reaction mixture.

It has been found, and it is a further aspect of the invention, that by repeating the carbonation and barium methylate treating steps of the process (i.e., steps 3–6 inclusive) one or more times, additional amounts of barium can be incorporated into the barium salt products.

The employment of a hydrocarbon solvent for the phosphorus sulfide-hydrocarbon reaction product is advantageous in the process of the invention due to the fact that these products, as well as the high barium-content salt products, are generally quite viscous. The solvent reduces the viscosity of the reaction mixture and greatly facilitates the process, particularly the carbonation step(s) and the final filtration and handling of the product. Any of the known hydrocarbon solvents of suitable boiling range, such as petroleum oil, petroleum naphtha or the like may be used. The use of a mineral oil, however, is preferred, since it need not be removed from the final product, the oil solution of the product thus obtained being directly blendable with a base lubricating oil desired to be improved therewith.

The barium methylate-methanol reagent utilized in the process of the invention is prepared by reaction of barium oxide with excess methanol to provide a methanol solution of barium (as barium methylate). The ratio of methanol to barium (as barium methylate) in this reagent may suitably vary from about 20 to about 40 mols of methanol per mol of barium, the preferred ratio being from about 25 to 30 mols of methanol per mol of barium. Although higher proportional amounts of methanol can be used, such use is impracticable, since it unnecessarily increases the size of the reactor which may be used and prolongs the time required for the subsequent distillation of the methanol. The use of lesser proportions of methanol, on the other hand, results in a two-phase( solid-liquid, reagent which is not so easy to handle, particularly in a commercial operation, as is the homogeneous reagent provided by the use of the proportions of methanol, above specified. Also, it has been found that the use of lower ratios of methanol to barium lowers the efficiency of the process from the standpoint of barium utilization and also adversely affects the clarity and filterability of the product.

The presence of water along with the barium methylate reagent is necessary for the success of the process. It has been found that amounts of water varying between about 2 and about 4 mols per mol of barium (as barium methylate) are suitable, the preferred amount being from about 2.5 to about 3 mols per mol of barium. The use of less than these proportions of water has been found to lower the efficiency of barium utilization in the process, whereas the use of higher proportions likewise makes for lower barium utilization and also causes filtration difficulties.

The amount of barium (as barium methylate) charged to the initial reaction with the phosphorus sulfide-hydrocarbon product must be in excess of that required for formation of a normal barium salt of the said product, so that a "basic" salt is formed in this reaction. Since the weight ratio of barium to phosphorus in a normal salt of the phosphorus sulfide-reaction product is approximately 4, the weight proportion of barium charged in this step must be greater than 4 parts per part of phosphorus supplied by the phosphorus sulfide-hydrocarbon reaction product in order for a basic salt to be formed.

Accordingly, the amount of barium methylate employed should be sufficient to provide from about 4.5 parts, and preferably about 5 to 8 parts, of barium per part of phosphorus supplied by the phosphorus sulfide-hydrocarbon reaction product, the basic salt thus formed containing more than 4 and up to about 6 parts of barium per part of phosphorus. It has been found that the use of higher amounts of barium will not provide salts having barium to phosphorus ratios higher than about 6. Thus, the formation of salts having ratios above this level requires carbonation of the basic barium salt and subsequent reaction of the carbonated salt with additional barium methylate in accordance with the process of the invention.

The carbonation of the basic barium salt formed in the initial barium methylate reaction should be carried out to an extent sufficient to incorporate into the basic salt substantially one mol of carbon dioxide for each mol of basic barium (i.e., barium over and above that constituting neutral salt) present in the basic barium salt. Expressed on a weight basis, this amounts to substantially 0.3 part of carbon dioxide per part of basic barium in the basic salt.

The amount of barium (as barium methylate) employed in the subsequent barium methylate treating step of the process can vary from a very small amount, say, about 0.25 to about 4.0 parts, by weight, preferably about 3 to 4 parts, per part of phosphorus supplied by the starting phosphorus sulfide-hydrocarbon reaction product. As aforesaid, additional carbonation and barium methylate treating steps may be employed to further raise the barium level of the product salts, each carbonation step being carried out to an extent sufficient to incorporate about 0.3 part, by weight, of carbon dioxide per part of barium incorporated by the preceding barium methylate reaction.

It should be pointed out that in some of the illustrative examples given hereinafter, the barium methylate reagent was supplied to the initial barium methylate reaction in two portions with water being added only in connection with the second portion. Thus, since the presence of water is not necessary for the formation of the normal salt of the phosphorus sulfide-hydrocarbon reaction product but only the basic salt, it need not be added with the first portion of barium methylate charge. This procedure is preferred over addition to the entire charge of barium methylate solution and water at once, since it permits use of a smaller reaction vessel than required by the latter procedure. This is, of course, an economic advantage from the standpoint of commercial operation.

The process of the invention may be applied to phosphorus sulfide-hydrocarbon reaction products in general. Thus, the phosphorus sulfides used to prepare these products may be any of the known phosphorus sulfides, such as $P_2S_5$, $P_2S_3$, $P_4S_7$, etc., $P_2S_5$ being particularly preferred.

The hydrocarbons which may be phosphosulfurized, on the other hand, may be any of those described in detail in U.S. Patents Nos. 2,316,080, 2,316,082, and 2,316,088, issued April 3, 1943, to Clarence M. Loane and James W. Gaynor, and U.S. Patent No. 2,806,022, issued September 10, 1957, to Albert R. Sabol.

Briefly, the hydrocarbon constituent is preferably a mono-olefinic hydrocarbon polymer resulting from the polymerization of low molecular weight mono-olefinic hydrocarbons, such as propylenes, butylenes and amylenes, or copolymers obtained by the polymerization of hydrocarbon mixtures containing iso-mono-olefins and mono-olefins of less than 6 carbon atoms. The polymers may be obtained by polymerization of these olefins or mixtures of olefins in the presence of a catalyst, such as sulfuric acid, phosphoric acid, boron fluoride, aluminum chloride or other similar halide catalysts of the Friedel-Crafts type.

To prepare the phosphorus sulfide-hydrocarbon reaction product, the hydrocarbon, such as, for example, an olefinic polymer of the desired molecular weight is reacted with from about 1% to about 50%, and preferably from about 5% to about 25%, of a phosphorus sulfide, e.g., $P_2S_5$, at a temperature of from about 200° F. to about 600° F. in a non-oxidizing atmosphere, such as an atmosphere of nitrogen. The reaction is carried out for from about one to about 10 hours or more and preferably for about 5 hours. The reaction product obtained is then hydrolyzed at a temperature of from about 200° F. to about 500° F. and preferably at a temperature of from about 300° F. to about 400° F. by suitable means, such as by introducing steam into the reaction mass. The hydrolyzed product containing inorganic phosphorus acid formed during the hydrolysis may then be contacted with an adsorbent material, such as Attapulgus clay, fuller's earth or the like, at a temperature of from about 100° F. to about 500° F. and the product filtered to obtain a filtrate substantially free of inorganic phosphorus acid and low molecular weight organic phosphorus compounds. Although this latter treating step is not necessary in the present process hydrolysis of the product is preferred since it has been found to provide better barium utilization and improved overall processing. The hydrolyzed reaction product of the phosphorus sulfide and hydrocarbon, with or without clay treating, is then diluted in a normally liquid hydrocarbon, generally the same or similar to the hydrocarbon in which the finished additive is to be employed, to a phosphorus content of from about 0.05% to about 5% and preferably to a level of from about 1% to about 2%.

Of the broad class of phosphosulfurized hydrocarbons to which the present process is applicable, hydrolyzed products formed by the reaction of phosphorus pentasulfide with olefin polymers having molecular weights of from about 500 to about 50,000, particularly polypropylenes and polybutylenes having molecular weights of from about 500 to about 1500, are preferred.

A full understanding of the invention will be had from the following illustrative examples.

EXAMPLE 1

(a) A propylene polymer of about 670 molecular weight was reacted with 15% $P_2S_5$ at a temperature of 220–225° C. for 8 hours. The product was filtered and then hydrolyzed at 150–160° C. steam for 6 hours. The product was then diluted with process oil (a conventional 100 sec. at 110° F. paraffin oil) and dried at 150–160° C. with a nitrogen purge. The product, at this point, approximates one-third process oil. Analysis: 2.69% P, 1.92% S.

(b) To a mixture of 200 grams of the above oil-diluted, hydrolyzed product, there was added 160 grams of process oil and 150 grams of barium methylate reagent containing 11.8% barium and 1.7% water formed from the reaction of barium oxide and methanol ($CH_3OH/Ba$ mol ratio=29.5; $H_2O/Ba$ mol ratio=1.0). The reaction mixture was heated with stirring to a temperature of 95° C. to distill off the alcohol and water. After cooling the reaction mixture to about 65° C., 150 additional grams of the barium methylate reagent and 4.6 grams of water was added (total $H_2O/Ba$ mol ratio= 3.0). The reaction mixture was then refluxed for 3 hours (68° C.) after which the temperature was raised to 150° C. whereby the alcohol and water were stripped off. A sample of the product was withdrawn and filtered for analysis. It analyzed as follows: 7.83% Ba, 1.34% P, 1.09% S; Ba/P weight ratio=5.8.

(c) One hunderd and fifty grams of the (unfiltered) product from (b) was heated to 150–160° C. and blown with carbon dioxide gas for one hour to incorporate therein 1.1% of carbon dioxide. To the carbonated mixture there was then added 59 grams of barium methylate-methanol reagent (12.7% barium and 1.8% water) and 1.9 grams of water ($CH_3OH/Ba$ mol ratio=27; total $H_2O/Ba$ mol ratio=3). The mixture was stirred under reflux for 2 hours. The temperature was then raised to 150° C. allowing distillation of the alcohol and water. The reaction mixture was held at 150° C. for an additional hour while purging with nitrogen. The mixture was then blown with carbon dioxide gas for one hour at 150° C. The mixture was then cooled to 65° C. and a second charge of the barium methylate reagent (59 grams) and water (1.9 grams) added, followed by refluxing for 2 hours. As before, the temperature was then raised to 150° C. to remove the alcohol and water. The product mixture was then subjected to a final carbonation at 150° C. for one hour after which it was filtered hot through a Büchner funnel precoated with "Hyflo" (a diatomaceous earth filter aid). The product thus obtained analyzed as follows: 15.8% Ba (theo.=16%), 1.19% P, 0.88% S; Ba/P=13.3.

Although the product in this instance was subjected to a final carbonation, this is not necessary from the standpoint of attaining the high barium-content salt products but is found desirable in some instances from the standpoint of filterability and/or lowered pH of the final products.

It has been found that multiple addition of the barium methylate and water with intermediate carbonation as in the foregoing example rather than carbonation followed by addition of the whole barium methylate charge at once is advantageous from the standpoint of more complete utilization of barium in the formation of the high level barium-content products. This is illustrated by the following example where an attempt was made to raise the barium to phosphorus ratio of the salt formed in (b) above by carbonation and a single addition of barium methylate rather than a stagewise addition with intermediate carbonation as in Example 1(c).

EXAMPLE 2

One hundred and fifty grams of the (unfiltered) barium salt prepared in Example 1(b) was heated to 150–160° C. and blown with carbon dioxide for one hour. To the carbonated product there was then added 118 grams of barium methylate solution (12.7% Ba, 1.8% water) and 3.8 grams of water, the mixture was then stirred under reflux conditions for 2 hours. The temperature was then brought to 150° C. allowing distillation of the methanol and water. The mixture was held for one hour at 150° C. while purging with nitrogen and then blown with carbon dioxide for one hour at this temperature. The product was then filtered through a heated, "Hyflo" precoated Büchner funnel. Analysis: 11.8% Ba (theo.=16%), 1.25% P, 1.05% S; Ba/P=9.45.

The following examples illustrate the preparation of salts having still higher barium contents and barium to phosphorus ratios than in Example 1.

EXAMPLE 3

Two thousand grams of an unfiltered barium salt prepared after the fashion of Example 1(b) and containing 7.8% barium was heated to 150–160° C. and blown with carbon dioxide for one hour. To the carbonated product there was charged 800 grams of barium methylate (12.7% Ba, 1.8% water) and 26.4 grams of water ($CH_3OH/Ba$ mol ratio=27; total $H_2O/Ba$ mol ratio=3.0). The mixture was then refluxed for 2 hours. The temperature was then raised to 150° C. to distill off the alcohol and water. It was then carbonated with carbon dioxide at the latter temperature for 2 hours. After cooling to 65° C., the above sequence of steps was repeated until a total of four such barium methylate-water additions and carbonations had been conducted. The product was then filtered as in the previous examples. Analysis: 21.7% Ba, 0.94% P, 0.84% S, 6% $CO_2$; Ba/P=23.

EXAMPLE 4

One hundred and fifty grams of the carbonated product from Example 3 and 82 grams of a methanol solution of barium methylate (12.7% Ba, 1.8% water) and 2.7 grams of water were refluxed for 2 hours ($CH_3OH/Ba$ mol ratio=27; total $H_2O/Ba$ mol ratio=3). The temperature was raised to 150° C., the mixture purged with nitrogen for one hour and then carbonated at this temperature for one hour. A 20-gram sample was removed and filtered. Analysis: 25.0% Ba, 0.83% P; Ba/P ratio=30. The remaining material in the reaction flask was reacted with the same amounts of barium methylate and water as described above. When the temperature during the stripping operation reached 130° C., the reaction product became extremely viscous. Xylene (100 cc.) was added and the drying completed at 150° C. The reaction mixture was then carbonated for one hour at this temperature. The product was filtered with difficulty. The xylene was removed by purging with a vigorous stream of nitrogen at 170–175° C. Analysis: 27.9% Ba, 0.76% P, 8.0% $CO_2$; Ba/P=36.8.

Although in the previous examples a refluxing of the reaction mixture after each addition of the barium methylate and water was employed, it has been found that this is not essential to the obtainment of the high level barium-content salts in the process of the invention. The following example illustrates the preparation of a 12% barium salt by simply heating the reaction mixture to remove the water and alcohol after each addition of the alcoholic barium methylate (i.e., without the employment of a refluxing period). In this preparation a "wet" (i.e., water-containing) barium methylate reagent was employed. This reagent contained 11.3% barium and 3.8% water ($CH_3OH/Ba$ mol ratio=30.3; $H_2O/Ba$ mol ratio=2.5).

EXAMPLE 5

A propylene polymer of approximately 840 molecular weight which had been phosphosulfurized with 16%, by weight, of phosphorus sulfide and hydrolyzed as in Example 1(a) was used. Analysis: 3.83% P, 3.69% S. Eighteen hundred and thirty grams of this material was diluted with 2170 grams of process oil (to a calculated phosphorus level of 1.7%) and placed in a suitable reaction flask. An 1848-gram portion of the "wet" barium methylate reagent was then added. The stirred mixture was then heated to 150° C. to distill off the alcohol and water with the assistance of a nitrogen sweep. After cooling to 65° C., an additional 1848-gram portion of the barium methylate reagent was added and the same procedure was repeated, except that after reaching 150° C. the product was then treated with carbon dioxide gas for two hours. A third addition of the barium methylate reagent (1848 grams) was made and the alcohol and water removed as before. The product was then subjected to a final carbonation for 2 hours and filtered hot through a "Hyflo" precoated Büchner funnel. Analysis: 12.8% Ba, 1.45% P, 1.24% S, 3.6% $CO_2$; Ba/P=8.84.

The following example is presented to show that barium salts having barium to phosphorus ratios substantially above about 6 cannot be attained without application of the intermediate carbonation step of the process.

EXAMPLE 6

A propylene polymer of about 850 molecular weight was treated with about 13% phosphorus sulfide at 220–250° C. and steam hydrolyzed (analysis: 2.98% P, 2.36% S). The product was diluted with process oil to a calculated phosphorus level of 1.7%.

To two hundred grams of the oil-diluted product there was added 80 grams of methanol-barium methylate solution containing 13.2% barium and 2% water ($CH_3OH/Ba$ mol ratio=28.6; $H_2O/Ba$ mol ratio=1.0). The reaction mixture was heated to 95° C. allowing the alcohol and water to distill off. The temperature was then held at 95° C. for one-half hour while purging with nitrogen. The reaction mixture was cooled to 65° C. A second 80-gram portion of barium methylate solution (13.2% Ba, 2% water) and 3 grams of water was added (total $H_2O/Ba$ mol ratio=3.0). The alcohol and water were removed by distillation to a temperature of 150° C. and the mixture held at this temperature for one hour with a nitrogen purge. A third 80-gram portion of barium methylate solution and 3 grams of water were added and the alcohol and water removed by heating to 150° C. as before. The product was finally carbonated and filtered very rapidly through a heated "Hyflo" precoated Büchner funnel. Analysis: 9.69% Ba (theo. 13.3), 1.5% P; Ba/P=6.5.

It will be seen that although the ratio of barium to phosphorus (in the starting phosphosulfurized polymer) charged in each of the three barium methylate reactions in this example was 3:1 so that theoretically the barium to phosphorus ratio in the resulting salt product should have been about 9, a ratio of only 6.5 was actually attained.

It will be apparent from the foregoing examples that the present invention provides a method for the preparation of barium salts of phosphorus sulfide-hydrocarbon products having exceptionally high barium contents and barium to phosphorus ratios.

The exceptional ability of the high barium-content salts of the invention as lubricating oil detergents has been shown by comparative engine tests conducted on an oil containing a basic barium salt prepared after the fashion of Example 1(b) and the same base oil containing a barium salt prepared as in Example 2. The test used was the Caterpillar engine test. This test determines the ability of an oil to prevent piston deposits. A single-cylinder, 4-cycle Caterpillar engine is used. The operating conditions are as follows:

Oil temperature _____° F__ 150
Jacket temperature _____° F__ 180
Speed _____r.p.m__ 1000
Brake load _____H.P__ 19.8

The duration of the test is 240 hours. The amount of piston deposits at the end of the test is expressed by a piston cleanliness rating based on a scale of from 0 to 100, a rating of 100 signifying a perfectly clean piston. The diesel fuel used in the tests was a high-sulfur content fuel (1.0% sulfur). The base oil used in the tests was an SAE 30, conventionally-refined, Mid-Continent oil containing 0.5% of a commercial antioxidant (zinc dialkyl dithiophosphate). The results of the tests are given in Table I.

*Table I.—Caterpillar tests*

| Product added | Conc., percent | Ba in product, percent | Ba in oil, percent | Piston rating |
| --- | --- | --- | --- | --- |
| Example 1(b) [1] | 4.5 | 7.78 | 0.35 | 99.3 |
| Example 2 [2] | 3.0 | 11.60 | 0.35 | 99.5 |

[1] A repeat preparation of Example 1(b).
[2] A repeat preparation of Example 2.

It will be seen from Table I that although both barium salts provided high piston ratings in the oil, on an equal barium (concentration) basis, only 3.0% of the barium salt of Example 2 (a salt typical of the salts of the present invention) was required as opposed to 4.5% of Example 1(b). The high barium-content salts of the invention are, therefore, seen to be more powerful detergents on a weight for weight basis than the lower barium content salts of the prior art.

It will be appreciated that the high barium-content salts of the invention are ordinarily prepared in the form of concentrated oil solutions thereof, which are blended as such with lubricating oil base stocks to form finished lubricating oils. The concentration of the product salts in these product oil concentrates will, of course, differ depending upon the amount of diluent oil used in their preparation. However, these differences can be eliminated by standardization of process conditions, such as the amount of diluent oil used or by final adjustment of the product oil solution to some standard salt content which will be readily appreciated by those skilled in the art. Expressed on the basis of actual salt concentration, i.e., on an oil-free basis, the product salts may be incorporated into the finished lubricating oils in amounts ranging from about 0.1% to about 30%, by weight, the amount used depending upon the application for which the oil is intended. Thus, oils designed for use in gasoline engines will require smaller amounts, generally from about 0.01% to about 10% of the product salts, while diesel engine oils, particularly those used in engines operated on high sulfur-content fuels (1%–5% sulfur), such as marine diesels, will require higher amounts, i.e., from about 1% to about 30%.

Lubricating oils in which the barium salts of the invention are employed may also contain other additives designed to improve the various characteristics thereof, such as V.I. improvers, pour point depressants, antioxidants, anti-rust agents, anti-foamants, etc.

Although the present invention has been described herein by means of certain specific embodiments and illustrative examples, it is not intended that the scope thereof be limited in any way thereby, but only as indicated in the following claims.

What is claimed is:

1. A process for preparing a high barium-content salt of a phosphorus sulfide-polyolefin reaction product which comprises the steps of (1) forming a reaction mixture comprising (a) a hydrocarbon solution of the phosphorus sulfide-polyolefin reaction product, (b) a methanol solution of barium methylate containing from about 20 to about 30 mols of methanol per mol barium, in an amount to supply the said reaction mixture an excess of barium methylate over that required to form a normal barium salt of said phosphorus sulfide-polyolefin reaction product and (c) water, in an amount to supply to said reaction mixture from about 2 to about 4 mols of water per mol of barium supplied by the barium methylate solution, (2) heating the reaction mixture at a temperature of from about 65° C. to about 200° C. and distilling off alcohol and water therefrom, whereby a basic barium salt of the phosphorus sulfide-polyolefin reaction product is formed, (3) intimately contacting the reaction mixture with carbon dioxide gas while maintaining said mixture at a temperature of from about 90° C. to about 200° C. to incorporate into said basic barium salt about 0.3 part, by weight, of carbon dioxide per part of basic barium present in said salt, (4) lowering the temperature of the reaction mixture to a level below about 65° C., (5) adding additional methanol solution of barium methylate and water to the reaction mixture in amount to supply from about 0.25 to about 4 parts, by weight, of barium per part of phosphorus supplied to the reaction mixture in step 1 by the phosphorus sulfide-polyolefin reaction product, the mol proportions of methanol and water to barium being the same as in step 1, (6) again heating the reaction mixture at a temperature of from about 65° C. to about 200° C. and distilling off alcohol and water therefrom and (7) filtering the reaction mixture to recover a hydrocarbon solution of the high barium-content salt of the phosphorus sulfide-polyolefin reaction product.

2. The process of claim 1 wherein in at least one of steps 2 and 6 the reaction mixture is maintained at reflux for a period up to about 6 hours prior to distillation of the alcohol and water.

3. The process of claim 1 wherein the reaction mixture from step 6 is subjected to further carbonation and reaction with additional barium methylate solution and water to incorporate additional barium into the barium salt product.

4. The process of claim 1 wherein in steps 1 and 2 the methanol solution of barium methylate (b) and the water (c) are combined and added portionwise to the hydrocarbon solution of the phosphorus sulfide-polyolefin reaction product (a), the reaction mixture being heated after each addition to remove alcohol and water therefrom.

5. A process for preparing a high barium-content salt of a reaction product of phosphorus pentasulfide and a polymer of a low molecular weight mono-olefin, said polymer having a molecular weight of from about 500 to about 50,000, which comprises the steps of (1) forming a reaction mixture comprising (a) a hydrocarbon solution of the phosphorus pentasulfide-polymer reaction product, (b) a methanol solution of barium methylate containing from about 20 to about 30 mols of methanol per mol of barium, in an amount to supply said reaction mixture an excess of barium methylate over that required to form a normal barium salt of said phosphorus pentasulfide-polymer reaction product and (c) water, in an amount to supply to said reaction mixture from about 2 to about 4 mols of water per mol of barium supplied by the barium methylate solution, (2) heating the reaction mixture at a temperature of from about 65° C. to about 200° C. and distilling off alcohol and water therefrom, whereby a basic barium salt of the phosphorus pentasulfide-polymer reaction product is formed, (3) intimately contacting the reaction mixture with carbon dioxide gas while maintaining said mixture at a temperature of from about 90° C. to about 200° C., to incorporate into said basic salt about 0.3 part of carbon dioxide per part of basic barium present in said basic salt, (4) lowering the temperature of the reaction mixture to a level below about 65° C., (5) adding additional methanol solution of barium methylate and water to the reaction mixture in an amount to supply from about 0.25 to about 4 parts, by weight, of barium per part of phosphorus supplied to the reaction mixture in step 1 by the phosphorus pentasulfide-polymer reaction product, the mol proportions of methanol and water to barium being the same as in step 1, (6) again heating the reaction mixture at a temperature of from about 65° C. to about 200° C. and distilling off alcohol and water therefrom and (7) filtering the reaction mixture to recover a hydrocarbon solution of the high barium-content salt of the phosphorus pentasulfide-polymer reaction product.

6. A process for preparing a high barium-content salt of a hydrolyzed reaction product of phosphorus pentasulfide and a propylene polymer having a molecular weight of from about 500 to about 1500 which comprises the steps of (1) forming a reaction mixture comprising (a) a hydrocarbon solution of the phosphorus pentasulfide-polymer reaction product, (b) a methanol solution of barium methylate containing from about 25 to about 30 mols of methanol per mol of barium, in an amount to supply to said reaction mixture an excess of barium methylate over that required to form a normal barium salt of said phosphorus pentasulfide-polymer reaction product and (c) water, in an amount to supply to said reaction mixture from about 2.5 to about 3 mols of water per mol of barium supplied by the barium methylate solution, (2) heating the reaction mixture at a temperature of from about 65° C. to about 200° C. and distilling off alcohol and water therefrom, whereby a basic barium salt of the phosphorus pentasulfide-polymer reaction product is formed, (3) intimately contacting the reaction mixture with carbon dioxide gas while maintaining said mixture at a temperature of from about 90° C. to about 200° C., to incorporate into said basic salt about 0.3 part of carbon dioxide per part of basic barium present in said basic salt, (4) lowering the temperature of the reaction mixture to a level below about 65° C., (5) adding additional methanol solution of barium methylate and water to the reaction mixture in an amount to supply from about 0.25 to about 4 parts, by weight, of barium per part of phosphorus supplied to the reaction mixture in step 1 by the phosphorus pentasulfide-polymer reaction product, the mol proportions of methanol and water to barium being the same as in step 1, (6) again heating the reaction mixture at a temperature of from about 65° C. to about 200° C. and distilling off alcohol and water therefrom and (7) filtering the reaction mixture to recover a hydrocarbon solution of the high barium-content salt of the phosphorus pentasulfide-polymer reaction product.

7. The process of claim 6 wherein in steps 1 and 2 the methanol solution of barium methylate (b) and the water (c) are combined and added portionwise to the hydrocarbon solution of the phosphorus pentasulfide-polymer reaction product (a), the reaction mixture being heated after each addition to remove alcohol and water therefrom.

8. As a new composition of matter, a high barium-content salt of a phosphorus sulfide-polyolefin reaction product characterized by a barium to phosphorus weight ratio substantially greater than 6, said salt being prepared by the process which comprises the steps of (1) forming a reaction mixture comprising (a) a hydrocarbon solution of the phosphorus sulfide-polyolefin reaction product, (b) a methanol solution of barium methylate containing from about 20 to about 30 mols of methanol per mol of barium, in an amount to supply to said reaction mixture an excess of barium methylate over that required to form a normal barium salt of said phosphorus sulfide-polyolefin reaction product and (c) water, in an amount to supply to said reaction mixture from about 2 to about 4 mols of water per mol of barium supplied by the barium methylate solution, (2) heating the reaction mixture at a temperature of from about 65° C. to about 200° C. and distilling off alcohol and water therefrom, whereby a basic barium salt of the phosphorus sulfide-polyolefin reaction product is formed, (3) intimately contacting the reaction mixture with carbon dioxide gas while maintaining said mixture at a temperature of from about 90° C. to about 200° C. to incorporate into said basic barium salt about 0.3 part, by weight, of carbon dioxide per part of basic barium present in said salt, (4) lowering the temperature of the reaction mixture of a level below about 65° C., (5) adding additional methanol solution of barium methylate and water to the reaction mixture in amount to supply from about 0.25 to about 4 parts, by weight, of barium per part of phosphorus supplied to the reaction mixture in step 1 by the phosphorus sulfide-polyolefin reaction product, the mol proportions of methanol and water to barium being the same as in step 1, (6) again heating the reaction mixture at a temperature of from about 65° C. to about 200° C. and distilling off alcohol and water therefrom and (7) filtering the reaction mixture to recover a hydrocarbon solution of the high barium-content salt of the phosphorus sulfide-polyolefin reaction product.

9. As a new composition of matter, a high barium-content salt of a reaction product of phosphorus pentasulfide and a polymer of a low molecular weight mono-olefin, said polymer having a molecular weight of from about 500 to about 50,000, said salt being characterized by a barium to phosphorus weight ratio substantially greater than 6 and being prepared by the process which comprises the steps of (1) forming a reaction mixture comprising (a) a hydrocarbon solution of the phosphorus pentasulfide-polymer reaction product, (b) a methanol solution of barium methylate containing from about 20 to about 30 mols of methanol per mol of barium, in an amount to supply to said reaction mixture an excess of barium methylate over that required to form a normal barium salt of said phosphorus pentasulfide-polymer reaction product and (c) water, in an amount to supply to said reaction mixture from about 2 to about 4 mols of water per mol of barium supplied by the barium methylate solution, (2) heating the reaction mixture to a temperature of from about 65° C. to about 200° C. and distilling off alcohol and water therefrom, whereby a basic barium salt of the phosphorus pentasulfide-polymer reaction product is formed, (3) intimately contacting the reaction mixture with carbon dioxide gas while maintaining said mixture at a temperature of from about 90° C. to about 200° C., to incorporate into said basic salt about 0.3 part of carbon dioxide per part of basic barium present in said basic salt, (4) lowering the temperature of the reaction mixture to a level below about 65° C., (5) adding additional methanol solution of barium methylate and water to the reaction mixture in an amount to supply from about 0.25 to about 4 parts, by weight, of barium per part of phosphorus supplied to the reaction mixture in step 1 by the phosphorus pentasulfide-polymer reaction product, the mol proportions of methanol and water to barium being the same as in step 1, (6) again heating the reaction mixture at a temperature of from about 65° C. to about 200° C. and distilling off alcohol and water therefrom and (7) filtering the reaction mixture to recover a hydrocarbon solution of the high barium-content salt of the phosphorus pentasulfide-polymer reaction product.

10. As a new composition of matter, a high barium-content salt of a hydrolyzed reaction product of phosphorus pentasulfide and a propylene polymer having a molecular weight of from about 500 to about 1500, said salt being characterized by a barium to phosphorus weight ratio substantially greater than 6 and being prepared by the process which comprises the steps of (1) forming a reaction mixture comprising (a) a hydrocarbon solution of the phosphorus pentasulfide-polymer reaction product, (b) a methanol solution of barium methylate containing from about 25 to about 30 mols of methanol per mol of barium, in an amount of supply to said reaction mixture an excess of barium methylate over that required to form a normal barium salt of said phosphorus pentasulfide-polymer reaction product and (c) water, in an amount to supply to said reaction mixture from about 2.5 to about 3 mols of water per mol of barium supplied by the barium methylate solution, (2) heating the reaction mixture at a temperature of from about 65° C. to about 200° C. and distilling off alcohol and water therefrom, whereby a basic barium salt of the phosphorus pentasulfide-polymer reaction product is formed, (3) intimately contacting the reaction mixture with carbon dioxide gas while maintaining said mixture at a temperature of from about 90° C. to about 200° C., to incorporate into said basic salt about 0.3 part of carbon dioxide per part of basic barium present in said basic salt, (4) lowering the temperature of the reaction mixture to a level below about 65° C., (5) adding additional methanol solution of barium methylate and water to the reaction mixture in an amount to supply from about 0.25 to about 4 parts, by weight, of barium per part of phosphorus supplied to the reaction mixture in step 1 by the phosphorus pentasulfide-polymer reaction product, the mol proportions of methanol and water to barium being the same as in step 1, (6) again heating the reaction mixture at a temperature of from about 65° C. to about 200° C. and distilling off alcohol and water therefrom and (7) filtering the reaction mixture to recover a hydrocarbon solution of the high barium-content salt of the phosphorus pentasulfide-polymer reaction product.

11. A lubricating oil composition comprising a major proportion of mineral lubricating oil and from about 0.1% to about 30%, by weight, on an oil-free basis, of a high barium-content salt of a phosphorus sulfide-polyolefin reaction product characterized by a barium to phosphorus weight ratio substantially greater than 6, said salt being prepared by the process which comprises the steps of (1) forming a reaction mixture comprising (a) a hydrocarbon solution of the phosphorus sulfide-hydrocarbon reaction product, (b) a methanol solution of barium methylate containing from about 20 to about 30 mols of methanol per mol of barium, in an amount to supply to said reaction mixture an excess of barium methylate over that required to form a normal barium salt of said phosphorus sulfide-polyolefin reaction product and (c) water, in an amount to supply to said reaction mixture from about 2 to about 4 mols of water per mol of barium supplied by the barium methylate solution, (2) heating the reaction mixture at a temperature of from about 65° C. to about 200° C. and distilling off alcohol and water therefrom, whereby a basic barium salt of the phosphorus sulfide-polyolefin reaction product is formed, (3) intimately contacting the reaction mixture with carbon dioxide gas while maintaining said mixture at a temperature of from about 90° C. to about 200° C. to incorporate into said basic barium salt about 0.3 part, by weight, of carbon dioxide per part of basic barium present in said salt, (4) lowering the temperature of the reaction mixture to a level below about 65° C., (5) adding additional methanol solution of barium methylate and water to the reaction mixture in amount to supply from about 0.25 to about 4 parts, by weight, of barium per part of phosphorus supplied to the reaction mixture in step 1 by the phosphorous sulfide-polyolefin reaction product, the mol proportions of methanol and water to barium being the same as in step 1, (6) again heating the reaction mixture at a temperature of from about 65° C. to about 200° C. and distilling off alcohol and water therefrom and (7) filtering the reaction mixture to recover a hydrocarbon solution of the high barium-content salt of the phosphorus sulfide-polyolefin reaction product.

12. A lubricating oil composition comprising a major proportion of a mineral lubricating oil and from about 0.1% to about 30%, by weight, on an oil-free basis, of a high barium-content salt of a reaction product of phosphorus pentasulfide and a polymer of a low molecular weight mono-olefin having a molecular weight of from about 500 to about 50,000, said salt being characterized by a barium to phosphorus weight ratio substantially greater than 6 and being prepared by the process which comprises the steps of (1) forming a reaction mixture comprising (a) a hydrocarbon solution of the phosphorus pentasulfide-polymer reaction product, (b) a methanol solution of barium methylate containing from about 20 to about 30 mols of methanol per mol of barium, in an amount to supply to said reaction mixture an excess of barium methylate over that required to form a normal barium salt of said phosphorus pentasulfide-polymer reaction product and (c) water, in an amount to supply to said reaction mixture from about 2 to about 4 mols of water per mol of barium supplied by the barium methylate solution, (2) heating the reaction mixture at a temperature of from about 65° C. to about 200° C. and distilling off alcohol and water therefrom, whereby a basic barium salt of the phosphorus pentasulfide-polymer reaction product is formed, (3) intimately contacting the reaction mixture with carbon dioxide gas while maintaining said mixture at a temperature of from about 90° C. to about 200° C., to incorporate into said basic salt about 0.3 part of carbon dioxide per part of basic barium present in said basic salt, (4) lowering the temperature of the reaction mixture to a level below about 65° C., (5) adding additional methanol solution of barium methylate and water to the reaction mixture in an amount to supply from about 0.25 to about 4 parts, by weight, of barium per part of phosphorus supplied to the reaction mixture in step 1 by the phosphorus pentasulfide-polymer reaction product, the mol proportions of methanol and water to barium being the same as in step 1, (6) again heating the reaction mixture at a temperature of from about 65° C. to about 200° C. and distilling off alcohol and water therefrom and (7) filtering the reaction mixture to recover a hydrocarbon solution of the high barium-content salt of the phosphorus pentasulfide-polymer reaction product.

13. A lubricating oil composition comprising a major proportion of a mineral lubricating oil and from about 0.1% to about 30%, by weight, on an oil-free basis of a high barium-content salt of a hydrolyzed reaction product of phosphorus penta-sulfide and a propylene polymer having a molecular weight of from about 500 to about 1500, said salt being characterized by a barium to phosphorus weight ratio substantially greater than 6 and being prepared by the process which comprises the steps of (1) forming a reaction mixture comprising (a) a hydrocarbon solution of the phosphorus pentasulfide-polymer reaction product, (b) a methanol solution of barium methylate containing from about 25 to about 30 mols of methanol per mol of barium, in an amount to supply to said reaction mixture an excess of barium methylate over that required to form a normal barium salt of said phosphorus pentasulfide-polymer reaction product and (c) water, in an amount to supply to said reaction mixture from about 2.5 to about 3 mols of water per mol of barium supplied by the barium methylate solution, (2) heating the reaction mixture at a temperature of from about 65° C. to about 200° C. and distilling off alcohol and water therefrom, whereby a basic barium salt of the phosphorus pentasulfide-polymer reaction product is formed, (3) intimately contacting the reaction mixture with carbon dioxide gas while maintaining said mixture at a temperature of from about 90° C. to about 200° C., to incorporate into said basic salt about 0.3 part of carbon dioxide per part of basic barium present in said basic salt, (4) lowering the temperature of the reaction mixture to a level below about 65° C., (5) adding additional methanol solution of barium methylate and water to the reaction mixture in an amount to supply from about 0.25 to about 4 parts, by weight, of barium per part of phosphorus supplied to the reaction mixture in step 1 by the phosphorus pentasulfide-polymer reaction product, the mol proportions of methanol and water to barium being the same as in step 1, (6) again heating the reaction mixture at a temperature of from about 65° C. to about 200° C. and distilling off alcohol and water therefrom and (7) filtering the reaction mixture to recover a hydrocarbon solution of the high barium-content salt of the phosphorus pentasulfide-polymer reaction product.

References Cited by the Examiner

UNITED STATES PATENTS

| | | | |
|---|---|---|---|
| 2,881,206 | 4/59 | Kjonaas et al. | 252—33 X |
| 2,956,018 | 10/60 | Carlyle et al. | 252—18 |
| 3,014,866 | 12/61 | Ferm | 252—33 |
| 3,046,224 | 7/62 | Andress | 252—33 |

FOREIGN PATENTS

| | | |
|---|---|---|
| 605,743 | 9/60 | Canada. |
| 786,167 | 11/57 | Great Britain. |

DANIEL E. WYMAN, *Primary Examiner.*

DANIEL D. HORWITZ, *Examiner.*